June 4, 1968

A. J. INGOLIA 3,387,125

VEHICLE HEADLAMP ASSEMBLY

Filed Oct. 13, 1965

INVENTOR.
Anthony J. Ingolia
BY
E. J. Biskup
ATTORNEY

June 4, 1968  A. J. INGOLIA  3,387,125
VEHICLE HEADLAMP ASSEMBLY
Filed Oct. 13, 1965  2 Sheets-Sheet 2

INVENTOR.
Anthony J. Ingolia
BY
E. J. Biskup
ATTORNEY

United States Patent Office 3,387,125
Patented June 4, 1968

3,387,125
VEHICLE HEADLAMP ASSEMBLY
Anthony J. Ingolia, St. Clair Shores, Mich., assignor to General Motors Corporation, Detroit, Mich., a corporation of Delaware
Filed Oct. 13, 1965, Ser. No. 495,587
4 Claims. (Cl. 240—7.1)

ABSTRACT OF THE DISCLOSURE

A manually operable mechanism for a concealable headlight assembly wherein an actuator serves to rotate the assembly substantially 180 degrees from an exposed position to a concealed position. Each headlight assembly comprises a housing having a lamp mounted therein and structure to support the housing for rotation in a plane substantially parallel to the longitudinal axis of the vehicle. A spring is connected to the housing so that upon a small movement of the actuating lever the spring goes overcenter to carry the housing the remainder of the distance to obtain full movement to one of said positions.

---

This invention concerns a vehicle headlamp assembly and more particularly to such a headlamp assembly which can be concealed within the vehicle body when not in use.

One object of the present invention is to provide a concealable headlamp assembly.

Another object of the present invention is to provide a vehicle headlamp assembly and an operating mechanism for moving such an assembly between a concealed position and an exposed position wherein a beam of light can be projected forwardly of the vehicle.

A further object of this invention is to provide a manually operable mechanism for a concealable headlamp assembly wherein a limited amount of actuator movement serves to rotate the assembly substantially 180° from an exposed position to a concealed position and vice versa.

A still further object of this invention is to provide a concealable headlamp assembly and operating mechanism therefor that is simple in construction, durable in use and inexpensive to assemble and manufacture.

The above objects and others are accomplished in accordance with the invention by providing a headlamp assembly that is adapted to be mounted in each of a pair of elliptical openings formed in the forward end of a vehicle body on the opposite sides of the longitudinal axis thereof. Each headlamp assembly comprises a housing having a lamp mounted therein and is incorporated with means which support the housing for rotation about an axis lying in a plane that is substantially parallel to the longitudinal axis of the vehicle. The lamp housing is so shaped that in one position thereof it covers the associated opening, while in the second position thereof the headlamp is exposed to project a beam of light forward of the vehicle. Operating mechanism for synchronously rotating the headlamp assemblies between the two positions is provided and comprises a rotatably supported shaft which extends transversely of the vehicle. A crank is rigidly secured to each end of the shaft and a rod connects the headlamp assembly with the crank through a lost motion connection. A spring has one end fixed to the lamp housing and the other end connected to the body and is so located that upon a relatively small movement of an actuating lever, the lamp housing is rotated about its support axis to a point where the spring goes overcenter to carry the housing the remaining distance to obtain full movement to one of the two positions.

A more complete understanding of the present invention can be derived from the following detailed description when taken in conjunction with the drawings in which.

Figure 1:
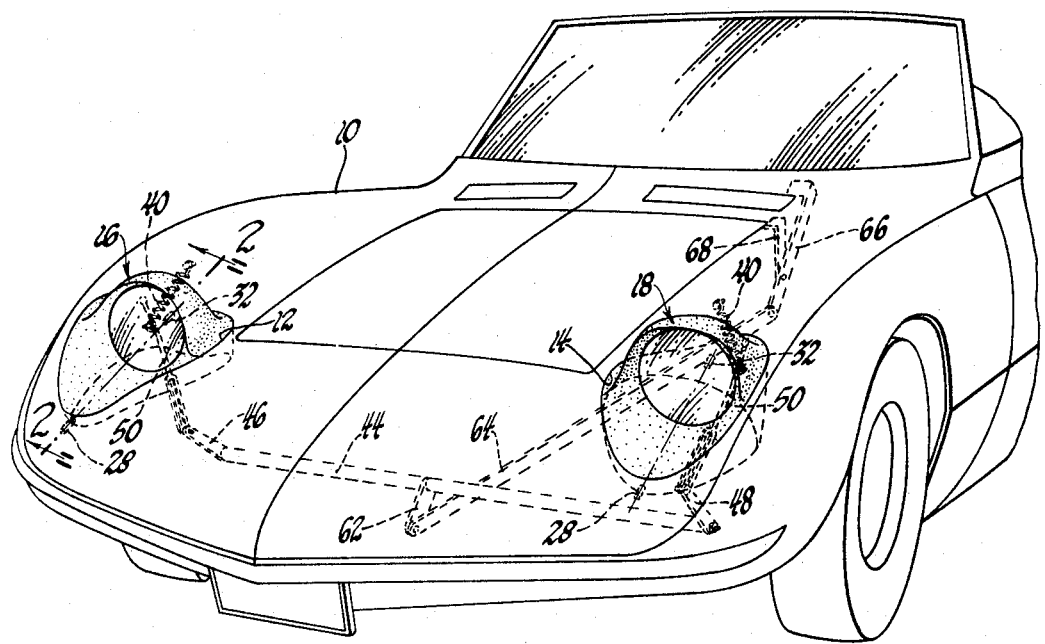
FIGURE 1 shows the front end of a vehicle incorporating a concealable headlamp assembly and operating mechanism made in accordance with the invention.

Referring now to FIGURE 1, the front end of a passenger vehicle is shown having a sheet metal body 10, the forward end of which is provided with substantially elliptical openings 12 and 14 which are laterally spaced and located adjacent the opposite sides of the vehicle. The respective openings 12 and 14 are provided with headlamp assemblies 16 and 18, each of which is supported for rotational movement about an axis which is substantially parallel to the longitudinal axis of the vehicle. The headlamp assemblies 16 and 18 are identical in construction and consequently a detailed description will be given of only one of the assemblies, it being understood that the same reference numerals will identify corresponding and identical parts incorporated with the other assembly.

Figure 2:
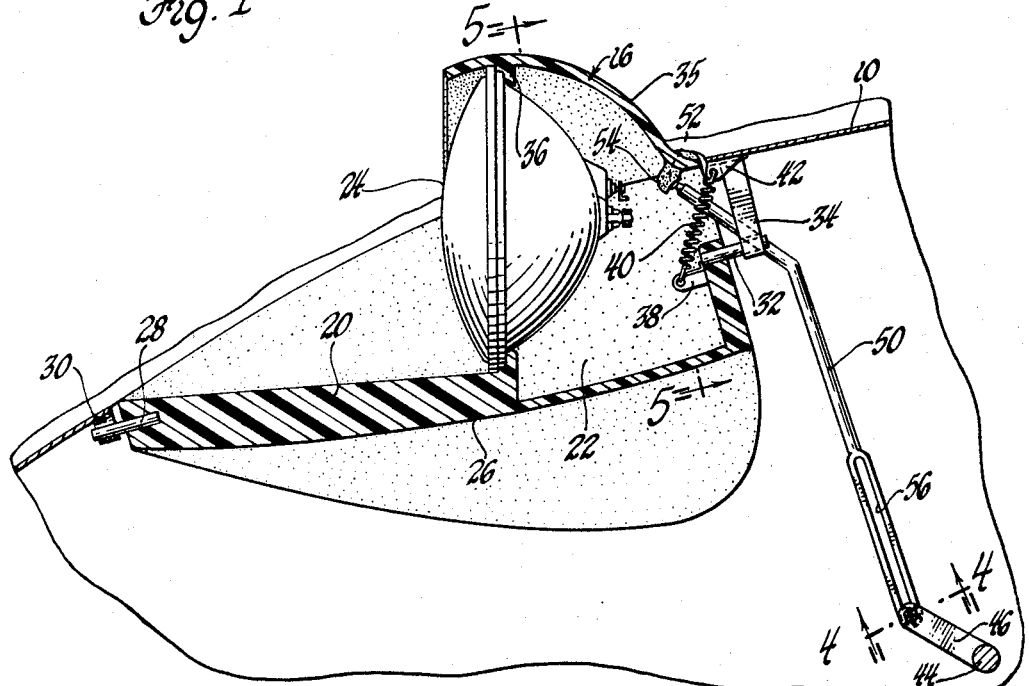
FIGURE 2 is an enlarged sectional view taken on line 2—2 of FIGURE 1.

Referring now to FIGURES 2 through 5, the headlamp assembly 16 is shown in detail and comprises a housing 20 having a cavity 22 formed therein for supporting a sealed beam headlamp 24 as seen in FIGURE 2. The housing 20 has a curved lower section 26, the forward end of which rigidly supports a pin 28 that is rotatably mounted in a bracket 30 secured to the vehicle body 10. The rear end of the housing similarly supports a pin 32 which is rotatably supported by a bracket 34 rigidly fixed to and depending from the sheet metal of the vehicle body. Thus, the pins 28 and 32 define the aforementioned axis about which the housing can rotate.

Figures 3, 4, 5:
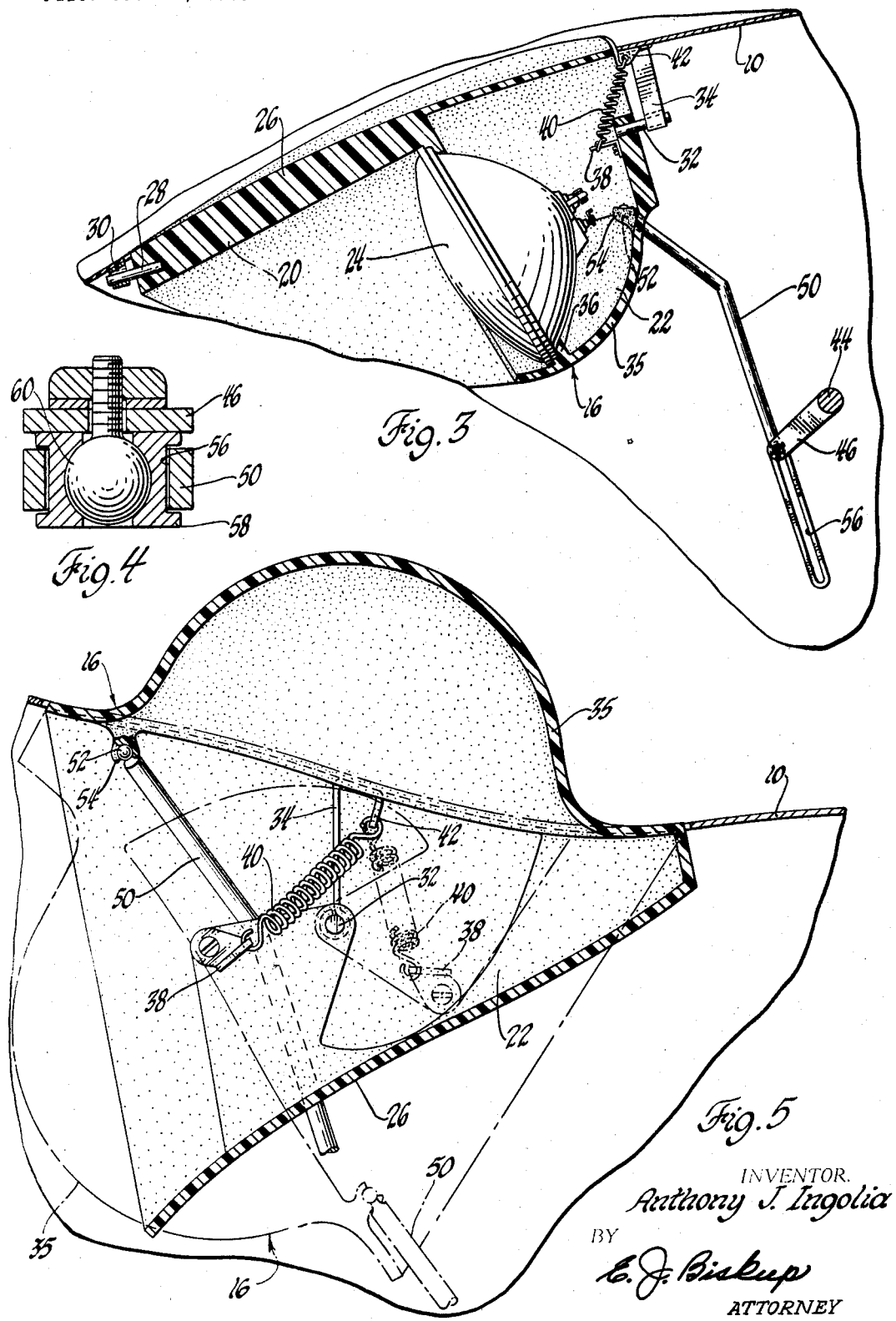
FIGURE 3 is a view similar to FIGURE 2 showing the lamp assembly in the concealed position.
FIGURE 4 is an enlarged view taken on line 4—4 of FIGURE 2.
FIGURE 5 is an enlarged view taken on line 5—5 of FIGURE 2.

As seen in FIGURE 2, the cavity 22 is enclosed by a semi-spherical roof portion 35 which includes an interiorly formed annular rib 36 for supporting the headlamp 24. It will be understood that the headlamp 24 can be connected in the conventional manner to a suitable source of electrical power for energizing each of the lamps. As best seen in FIGURES 2 and 5, a bracket 38 is fastened to the rear of the housing 24 to one side of the pin 32 and has an aperture which receives one end of a coil spring 40. The opposite end of the coil spring 40 is held by a flange 42 integrally joined to the bracket 34 and located at the other side of the pin 32. The spring serves to maintain the headlamp assembly 16 in the concealed position or exposed positions in a manner which will become more apparent as the description of the invention proceeds.

The operating mechanism for synchronously rotating the headlamp assemblies 16 and 18 about their respective supporting axes can be seen in FIGURE 1 and comprises a transversely extending shaft 44 which is supported for rotation about its longitudinal axis by means fixed to the vehicle body but not shown. The shaft 44 has the opposite ends thereof integrally formed with crank members 46 and 48, each of which is connected through a rod 50 to the associated lamp assembly. The upper end of each rod 50 is formed as a ball 52 which is received within a socket portion 54 integrally formed with the housing at a point radially spaced from the pin 32. In the form shown, the rod 50 is bent slightly so that it extends downwardly and rearwardly out of the housing cavity 22 and then projects downwardly for connection with the associated crank member. The lower end of the rod 50 has an elongated slot 56 formed therein for slidably accommodating a spool type roller 58 which is connected through a ball stud 60 to the crank member 46 as seen in FIGURE 4. A crank arm 62 is rigidly attached to the shaft 44 at a point intermediate the ends thereof and is pivotally connected through a drag link 64 to an actuating lever 66 which in turn is pivotally mounted for movement about a transverse horizontal axis by a support member 68 fixed to the vehicle body.

From the above description, it should be apparent that rotation of the lever 66 about its axis results in corresponding rotation of the shaft 44 and movement of the headlamp assemblies 16 and 18 between a concealed position wherein the headlamp is located interiorly of the vehicle and an exposed position wherein the headlamp is located above the plane of the vehicle to direct a beam of light forwardly thereof as seen in FIGURE 1. For example, assuming the headlamp assemblies 16 and 18 are in the exposed position as viewed in FIGURES 1 and 2 and it is desired to move them into the concealed position of FIGURE 3, the vehicle operator would accomplish this by simply moving the actuating lever 66 forwardly about its pivot connection so as to cause the link 64 to be drawn rearwardly with subsequent counterclockwise rotation of the shaft 44 as viewed in FIGURE 2. As the shaft 44 and accordingly the crank members 46 and 48 rotate, a downward force is exerted upon the rods 50 causing the headlamp assembly 16 to rotate counterclockwise about its support axes as defined by the pins 28 and 32 and as seen in FIGURE 5. The drawing or pulling action of the rods 50 is continued until the longitudinal axis of the spring 40 crosses the axis of rotation of the housing 20 whereupon the spring 40 then takes over and continues the rotation of the housing 20 until the latter assumes the position of FIGURE 3. The slot 56 formed in the lower end of each rod 50 takes up the continued rotation of the housing so that in the fully concealed position, the roller 58 is in the upper position as shown in FIGURE 3. It will be understood that during this time the other headlamp assembly 18 rotates in the opposite direction or clockwise as viewed in FIGURE 1 and the spring action is the same.

In order to move the headlamp assemblies 16 and 18 from the concealed position of FIGURE 3 to the exposed position of FIGURE 2, the lever is pulled toward the operator so as to cause the link 64 to move forwardly. Since each roller 58 is located in the upper portion of the slot 56 at this time and the shaft 44 is being rotated in a clockwise direction, an upward force is applied to the rod 50 so that the associated housing is moved about its rotational axis until the spring 40 again crosses over this axis, at which time, continued rotation of the housing is caused by the spring as explained above.

Various changes and modifications of the above-described invention can be made without departing from the principles of the invention. Such changes and modifications are contemplated and the inventor does not intend to be limited except by the scope of the appended claims.

I claim:

1. In combination with a vehicle having a body, a pair of openings formed in the forward end of said body on opposite sides of the longitudinal axis of the vehicle, a headlamp assembly located in each of said openings, said headlamp assembly comprising a housing supporting a headlamp, means connecting said housing to said body for rotation about an axis lying in a plane that is substantially parallel to said longitudinal axis, said housing being so shaped that in a first position thereof said housing covers said opening and in a second position thereof the headlamp is exposed to project a beam of light forward of the vehicle, operating means for synchronously rotating said headlamp assemblies between said first and second positions, and a spring having one end connected to the housing and the other end connected to the body with the points of connection of said spring with said body and housing being so located with respect to the axis of rotation of the headlamp assembly that said spring is caused to move through said latter-mentioned axis when the headlamp moves between said first and second positions.

2. In combination wtih a vehicle having a body, a pair of openings formed in said body on opposite sides of the longitudinal axis of the vehicle, a headlamp assembly located in each of said openings, said headlamp assembly comprising a housing, means connecting said housing to said body for rotation about an axis lying in a plane that is substantially parallel to said longitudinal axis, said housing being so shaped that in a first position thereof said housing covers said opening and in a second position thereof the headlamp is exposed to project a beam of light forward of the vehicle, operating means for synchronously rotating said headlamp assemblies between said first and second positions, said operating means comprising a rotatably supported shaft extending transversely of the vehicle, a crank rigidly connected to each of said shaft, a rod, a ball and socket connection joining one end of said rod with said housing, a pin and slot connection between the other end of said rod and said crank, a spring having one end connected to the housig and the other end connected to the body, and manually operable means connected to said shaft for rotating the latter whereby said headlamp assemblies selectively assume said positions.

3. In combination with a vehicle having a sheet metal body with the forward end thereof sloping downwardly, a pair of openings formed in said forward end of the body on opposite sides of the longitudinal axis of the vehicle, a headlamp assembly located in each of said openings, said headlamp assembly comprising a housing, means connecting said housing to said body for rotation about an axis lying in a plane that is substantially parallel to said longitudinal axis, said housing being so shaped that a in a first position thereof said housing covers said opening and in a second position thereof the headlamp is exposed to project a beam of light forward of the vehicle, operating means for synchronously rotating said headlamp assemblies between said first and second positions, said operating means comprising a rotatably supported shaft extending transversely of the vehicle, a crank rigidly connected to each end of said shaft, a rod, a ball and socket connection joining one end of said rod with said housing, a pin and slot connection between the other end of said rod and said crank, a spring having one end connected to the housing and the other end connected to the body with the points of connection of said spring with said body and housing being so located with respect to the axis of rotation of the headlamp assembly that said spring is caused to move through said latter-mentioned axis when the headlamp moves between said first and second positions, and manually operable means connected to said shaft for rotating the latter whereby said headlamp assemblies selectively assume said positions.

4. In combination with a vehicle having a sheet metal body with the forward end thereof sloping downwardly, a pair of ellipitical openings formed in said forward end of the body on opposite sides of the longitudinal axis of the vehicle, a headlamp assembly located in each of said openings, said headlamp assembly comprising a housing supporting a headlamp, means connecting said housing to said body for rotation about an axis lying in a plane that is substantially parallel to said longitudinal axis, said housing being so shaped that in a first position thereof said housing covers said opening and in a second position thereof the headlamp is exposed to project a beam of light forward of the vehicle, operating means for synchronously rotating said headlamp assemblies between said first and second positions, said operating means comprising a rotatably supported shaft extending transversely of the vehicle, crank rigidly connected to each end of said shaft, a rod, a ball and socket connection joining one end of said rod with said housing, a pin and slot connection between the other end of said rod and said crank, a spring having one end connected to the housing and the other end connected to the body with the points of connection of said spring with said body and housing being so located with respect to the axis of rotation of the headlamp assembly that said spring is caused to move through said latter-mentioned axis when the headlamp moves between said first and second positions, and manually operable means including a pivoted lever connected to said shaft for rotating the latter whereby said headlamp assemblies selectively assume said positions.

References Cited

UNITED STATES PATENTS

| | | | |
|---|---|---|---|
| 1,332,082 | 2/1920 | Townsend | 240—62.53 |
| 2,119,892 | 6/1938 | Snow | 240—7.1 |
| 2,329,684 | 9/1943 | Ashley | 240—7.1 |
| 2,457,211 | 12/1948 | De Smet et al. | 240—7.1 |

NORTON ANSHER, *Primary Examiner.*